Figure 1:
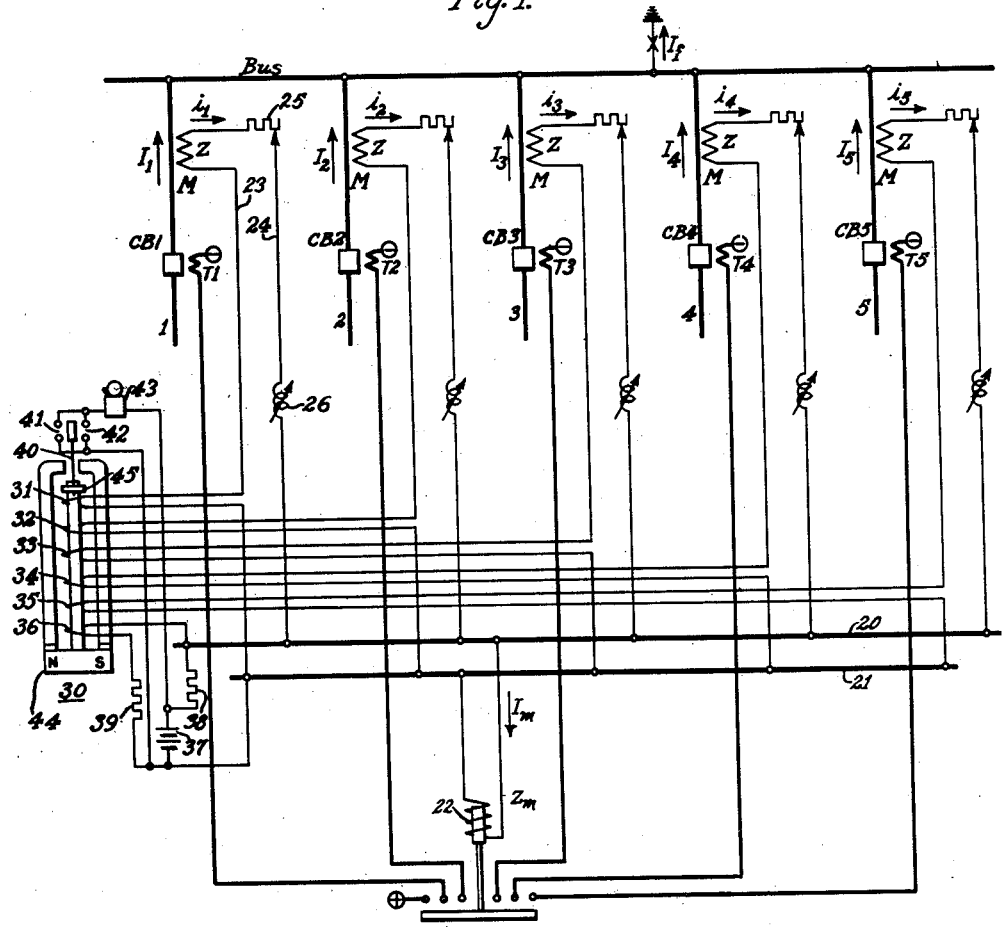

Oct. 5, 1943.  E. L. HARDER  2,331,186
TRANSFORMER CONNECTION FOR PROTECTIVE DEVICES
Filed May 3, 1941

WITNESSES:
E. F. Oberheim
Wm. C. Groome

INVENTOR
Edwin L. Harder.
BY O. B. Buchanan
ATTORNEY

Patented Oct. 5, 1943

2,331,186

UNITED STATES PATENT OFFICE 2,331,186

TRANSFORMER CONNECTION FOR PROTECTIVE DEVICES

Edwin L. Harder, Forest Hills, Pa., assignor to Westinghouse Electric & Manufacturing Company, East Pittsburgh, Pa., a corporation of Pennsylvania Application May 3, 1941, Serial No. 391,653

7 Claims. (Cl. 177—311)

My invention relates to protective devices for protecting a multi-terminal bus or other electrical aparatus against internal faults therein, and it has particular relation to the parallel connection of voltage-producing couplers or current-transformers which are substantially linearly responsive to the currents in the respective terminals of the bus or other protected electrical apparatus.

In a previous application, Serial No. 202,015, filed April 14, 1938, I showed a protective relay system, for bus-protection and other purposes, utilizing toroidal current-transformers which are both substantially linearly responsive to the terminal current, and substantially astatic or non-responsive to external influences. These toroidal current-transformers produce results differing from ordinary iron-core current-transformers in producing an internal voltage, which is substantially linearly responsive to the line-current, rather than a secondary current which reflects the phase and magnitude of the primary current, regardless of the secondary impedance. These toroidal current-transformers overcome a limitation of the iron-core type of current-transformer, which fails to properly reproduce the primary current under fault conditions, because of the loss of linearity of response which is suffered as a result of saturation in the iron cores of that type of current-transformers.

The toroidal current-transformers are useful, not only to avoid the distorting effects of iron-core saturation, which mismatch a plurality of ordinary current-transformers which are utilized to summate the terminal-currents of a multi-terminal bus, but they are also useful to provide a convenient means for obtaining a response to the sum of a large number of terminal-currents. Since the output of a toroidal current-transformer is a voltage, rather than a current, these toroidal transformers, when heretofore utilized for multi-terminal bus-protection, have had their secondary circuits connected in series-circuit relation, instead of the familiar parallel-circuit connection which is utilized with current-producing current-transformers. The series connection of the toroidal current-transformers has one disadvantage, however, in case one of the current-transformers should become open-circuited, in which case the entire bus-protective system would fail.

It is an object of my present invention to provide means whereby a plurality of these toroidal current-transformers, or other linear couplers, which are associated with a plurality of terminals of a bus or other electrical apparatus to be protected, may have their secondary circuits connected in parallel, and so arranged that the open-circuiting of any one of the parallel-connected secondary circuits (at least under favorable conditions, particularly where the number of terminals or feeders is large) will not cause a faulty relaying-operation.

Figure 2:
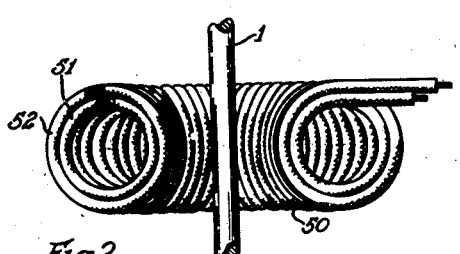
Figure 3:
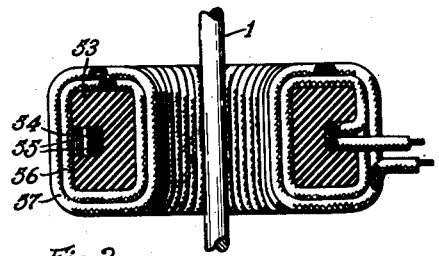

With the foregoing and other objects in view, my invention consists in the apparatus, circuits, combinations and methods hereinafter described and claimed, and illustrated in the accompanying drawing wherein:

Figure 1 is a diagrammatic view of circuits and apparatus embodying my invention in a preferred form, and Figs. 2 and 3 are detail-views showing different forms of the toroidal current-transformers or linear couplers which are diagrammatically represented in Fig. 1.

In Figure 1, I illustrate my invention as being applied to the protection of a multi-terminal alternating-current bus, which is marked "Bus" in the drawing. The bus may have any number of "terminals," or connections through which current is fed into, or out of, the bus; the terminal-current vectors $I_1$, $I_2$, etc., being considered to be positive if the current is flowing into the bus, in each case. In the illustrative form of my invention which is shown in Fig. 1, the bus has five terminals, which are represented by five feeders, 1, 2, 3, 4 and 5, some of which will be load-feeders, while others will be generator-feeders or feeders through which power is fed into the bus. My invention relates to an alternating-current bus or other electrical apparatus to be protected, and this bus or protected apparatus may be either single-phase or polyphase. Hence, Fig. 1 may be regarded as a single-line diagram, representative of a polyphase system; or it may be regarded as showing only one phase-conductor of either a single-phase or a polyphase system, as will be readily understood by those skilled in the art. Furthermore, by the expression "terminal," I mean to refer to any place or connection where current is led into or out of the bus, whether that current is a single-phase current or a polyphase current.

Each of the bus-terminals or feeders 1 to 5, or whatever number there are, is provided with its own circuit-breaker CB1, CB2, etc., each having its own trip-coil T1, T2, etc., which may be controlled, for feeder-protection, in any suitable manner (not shown) designed for the opening of any individual feeder-circuit in case of a fault out on the feeder itself. The feeder-protective system constitutes no part of my present invention, which is directed to the protective-measures which must be adopted when a fault occurs upon the bus itself, as indicated diagrammatically at X in Fig. 1. Upon the occurrence of a bus-fault, or an internal fault on the bus as distinguished from an external fault elsewhere in the electrical system, such a bus-fault can be cleared only by the opening of all of the circuit-breakers CB1, CB2, etc., in all the terminals for feeders 1 to 5 which are connected to the bus, and my present invention is directed to the bus-protective means which controls the simultaneous tripping or opening of all of the terminal circuit-breakers CB1, CB2, etc. This is done by vectorially adding, or summating all of the terminal-currents of the bus, and obtaining a response to a predetermined departure from the normal, or fault-free, condition in which the sum of the terminal-currents is zero.

In carrying out my invention, I interlink with each feeder or terminal 1 to 5, a linear coupler, or voltage-producing current-responsive device, which is diagrammatically represented, in Fig. 1, by a secondary winding or coil having a mutual reactance M and a secondary impedance Z. In actual practice, toroidal current-transformers are utilized, as shown in Figs. 2 and 3. These linear transforming devices operate by inducing a voltage $I_1M$, $I_2M$, etc., which, in each case, is a function of the terminal-current $I_1$, $I_2$, etc., multiplied by an impedance, M, said impedance M being substantially constant for all obtainable current-values, and being substantially the same for all of the terminals 1 to 5, or whatever number of terminals there are. The internal, current-responsive voltages $I_1M$, $I_2M$, etc., which are generated or induced in the secondary circuits of the several linearly responsive current-transformers, produce secondary currents which are indicated at $i_1$, $i_2$, etc.

In accordance with my invention, the several secondary windings M—Z are utilized as parallel-connected voltage-sources, of different voltage-magnitudes and phases dependent upon the relative magnitudes and phases of the respective terminal-currents $I_1$, $I_2$, etc., to supply relaying-energy to a single-phase output-terminal or measuring-circuit terminal, indicated by the relaying buses 20 and 21, which supply power to one or more fault-responsive relays or metering-devices 22, or other voltage-energized current-responsive means having a current $I_m$ and an impedance $Z_m$. In the form of invention shown in Fig. 1, the relay 22 is diagrammatically represented as a multi-contact contactor which energizes the several tripping-circuits to each of the trip-coils T1, T2, etc.; although it will be readily understood that the relay 22 might have been only a light-weight auxiliary relay which controls a larger tripping-relay for that purpose.

Since the parallel-connected linear couplers or current-transformers M—Z generate current-responsive voltages, rather than current-responsive currents, the parallel connection of these current-responsive voltage-sources will not produce, at the terminals 20 and 21 of the relay 22, a measuring-circuit voltage which is properly responsive to the vectorial sum of all of the terminal-currents $I_1$, $I_2$, etc., unless the secondary circuits of the linearly responsive voltage-producing current-transformers all have the same impedance, which I have diagrammatically indicated, in Fig. 1, by the impedance Z. These secondary circuits consist of the secondary coils of the responsive current-transformers indicated at M—Z, each of which is connected to the measuring-terminals 20 and 21 by means of electrical conductors 23 and 24 which, together with the secondary winding M—Z, constitute a secondary-circuit or a connecting-circuit between each of the linear couplers M and the output-terminals or measuring-circuit terminals 20 and 21 of the relaying system. The impedance Z of each of these several connecting-circuits will usually be made up principally or altogether of the secondary impedance Z of the current-transformer, said impedance Z being composed of a self-inductance quantity X and a resistance-component R. In actual practice, an auxiliary adjusting-resistance 25, and in some cases, also an auxiliary-adjusting inductance or reactance 26, may be included in each of the secondary-circuits for the purpose of exactly matching the total impedances Z of each of these circuits against each other.

In my improved relaying system, as just described, and as shown in Fig. 1, in the event of a fault on the bus, as indicated at X, the relaying-current $I_m$ in the fault-responsive relay or measuring-circuit 22 is directly proportional to the bus-fault current $I_f$, regardless of the distribution of this fault-current $I_f$ among the several bus-terminals. Designating the several terminal-currents, flowing into the bus, as $I_1$, $I_2$, $I_3$ ... $I_n$, and designating the corresponding secondary-currents as $i_1$, $i_2$, $i_3$ ... $i_n$, the voltage-equations of the various secondary circuits, for the $n$ terminals, are:

$$\left. \begin{array}{l} I_1M + i_1Z + I_mZ_m = 0 \\ I_2M + i_2Z + I_mZ_m = 0 \\ I_3M + i_3Z + I_mZ_m = 0 \end{array} \right\} \quad (1)$$

etc. Adding, for an $n$-terminal bus, $$M(I_1+I_2+I_3+ \ldots +I_n) + Z(i_1+i_2+i_3+ \ldots +i_n) + nI_mZ_m = 0 \quad (2)$$

Substituting the current-values, $$I_f = I_1+I_2+I_3+ \ldots +I_n \quad (3)$$

and $$I_m = i_1+i_2+i_3+ \ldots +i_n \quad (4)$$
$$I_fM + I_m(Z+nZ_m) = 0 \quad (5)$$

whence $$I_m = -\frac{M}{Z+nZ_m} I_f \quad (6)$$

in which all of the quantities are vector quantities.

Equation 6 proves that, at the fundamental frequency, the relay-current $I_m$ is proportional to the bus-fault current $I_f$, the constant of proportionality being $$\frac{M}{Z+nZ_m}$$

relay-amperes per fault-ampere. The denominator $(Z+nZ_m)$ may have any power-factor, either lagging, leading, or unity. If said denominator has a lagging reactance-component $X_D$ which is large in comparison to its resistance $R_D$, then the numerator M and the denominator $(Z+nZ_m)$ will both be largely inductive reactances, and the response $$\frac{M}{Z+nZ_m}$$

will be substantially independent of the frequency, no more for the harmonics than for the fundamental frequency of the alternating-current system; whereas, for direct-current, the numerator M becomes zero and the denominator $(Z+nZ_m)$ becomes a pure resistance, and the response to the D.-C. transient-component of the fault-current is very small.

With present manufacturing-methods for the quantity-production of the linear couplers, it is comparatively easy to maintain a manufacturing-accuracy of $\pm 2\frac{1}{2}\%$ in the uniformity of the various values of M in each of the $n$ circuits, and accuracies of a constancy within $\pm 1\%$ are commercially feasible; but, at present, accuracies of $\pm 0.25\%$ do not seem to be economically justified. That this is so, may be shown by assuming that an external fault-current, $-I_F$, is flowing in a terminal in which the mutual coupling is 1.01M, while the sum of the other $(n-1)$ terminal-currents is $I_F$, with mutual couplings of 0.99M in each. Then, instead of Equations 2 and 5, the sum of the voltage-equations will be $$-I_F(1.01M) + I_F(0.99M) + I_m(Z + nZ_m) = 0 \quad (7)$$

whence $$I_m = \frac{0.02M}{Z + nZ_m} I_F \quad (8)$$

For an external fault, therefore, that is, a fault outside of the protected bus, with a through-current $I_F$ flowing through the protected bus, the constant of proportionality is $$\frac{0.02M}{Z + nZ_m}$$

for the worst possible condition of unbalance of the mutual inductances M, with manufacturing accuracies of $\pm 1\%$. Comparing this quantity with the internal-fault response, where the constant of proportionality was $$\frac{M}{Z + nZ_m}$$

it will be seen that the fault-responsive relay is only 2% as sensitive to external faults as to internal faults, under the extreme conditions of unbalance of the linear current-transformers. It is usually quite feasible to give the fault-responsive relay a setting high enough so that it will not respond to 2%, or one-fiftieth, of the highest expectable through-fault current. In cases where greater than 25-to-1 ratio of maximum through-fault current to necessary relay-setting is encountered, it appears more economical and safe to use a restraint-winding on the relay, energized as illustrated in my application 202,015, rather than to carry the manufacturing tolerance below $\pm 1\%$. Note that this 25-to-1 ratio, which I am permitting, with a $\pm 1\%$ coil-tolerance, contemplates a 100% factor of safety.

The accuracy of my fault-detecting system also depends upon the accuracy with which the total impedances Z of the connecting-circuits are kept identical. Since the mutual inductances, M, of the several coupling-transformers, are designed so as to be substantially identical, the self-inductances, X, of the same can also be made substantially identical, by using the same number of secondary turns, because $$M = N_1 N_2 P \quad (9)$$

and $$X = N_2^2 P \quad (10)$$

where $N_1$ is the total number of primary turns or interlinkages of the toroid (being unity in the illustrated case), $N_2$ is the total number of secondary turns of the winding on the toroid, and P is the total permeance of the flux-path of the toroid. Since the inductance of the two wires 23 and 24 joining the toroidal current-transformer M—Z to the parallel connecting-points, or the measuring-voltage output-terminals of the entire series of summated current-responsive devices, is quite negligible as compared to the self-inductance X of the current-transformer, this inductance X may be regarded as representing the entire reactive part of the total impedance Z of each of the connecting-circuits. Any discrepancies between the actual inductances X of the several connecting-circuits may be compensated for, if necessary, by adjustments of the small variable inductors 26.

The resistances R of the several impedances Z of the connecting-circuits can be made identical (as by adjustments of the small variable resistors 25), but this may be done only for one particular operating-temperature, assuming that the toroidal current-transformers are wound with copper conductors, or with some other conducting material having a material or substantial temperature-coefficient of conductivity. It is pertinent to inquire, therefore, what effect a temperature-difference of, say 30° C. might have on the tendency to operate the fault-responsive relay 22 on "through" faults.

Assume, for example, that half of the toroidal current-transformers are operating at 20° C., and the other half at 50° C., and that a through fault-current, $I_F$, is coming in over the low-temperature transformers, each having a resistance of R and going out over the high-temperature ones, each having a resistance of $$\frac{234.5 + 50}{234.5 + 20} R = 1.12R$$

(for copper coils).

The effects of temperature-difference in the impedances Z are obviously less when the inductances X of the connecting-circuits are large in comparison to the resistances R, and the circuits can and should be made largely reactive whenever feasible. Where the available spaces for the coupling-transformers are limited, however, it may be necessary to utilize a value of X which is equal to R or which may be even less than R in extreme cases. Thus, the ratio of the hot-coil impedance $\overline{Z}_h$ to the cold-coil impedance $\overline{Z}$ is $$\frac{\overline{Z}_h}{\overline{Z}} = \sqrt{\frac{X^2 + (1.12R)^2}{X^2 + R^2}} = \sqrt{1 + \frac{0.254R^2}{X^2 + R^2}} \quad (11)$$

If $\overline{X}$ is large with respect to R, the temperature-responsive increase in resistance makes practically no difference in the impedance Z.

Assuming, however, a case in which $\overline{X} = R$, in the impedance $Z = R + j\overline{X}$, then the increment 0.12R in the resistance-component, as a result of a 30° heating, will be only $0.12(\frac{1}{2}\sqrt{2})$, or 0.085, times the cold impedance $\overline{Z}$. Equation 2 then becomes $$M(I_1 + I_2 + I_3 + \ldots + I_n) + Z(i_1 + i_2 + i_3 + \ldots + i_n) + 0.085Z(i_2 + i_4 + \ldots + i_n) = -nI_m Z_m \quad (12)$$

For a through fault, $$I_1 + I_2 + I_3 + \ldots I_n = 0 \quad (13)$$

Substituting the value of the measuring-coil current $I_m$ from Equation 4, Equation 12 becomes $$ZI_m + 0.085Z(i_2 + i_4 + \ldots + i_n) + nI_m Z_m = 0 \quad (14)$$

Also, adding every alternate equation of the group of Equations 1, substituting the value of the hot-coil impedance $$\overline{Z}_h = \overline{Z}_h = 1.06\overline{Z}$$

obtained by putting $X=R$ in Equation 11, and remembering that the through-fault current is $$I_2 + I_4 + \ldots + I_n = -I_F \quad (15)$$

we obtain $$-I_F M + 1.06 Z(i_2 + i_4 + \ldots + i_n) + \frac{n}{2} I_m Z_m = 0 \quad (16)$$

whence $$(i_2 + i_4 + \ldots + i_n) = \frac{M I_F - \frac{n}{2} I_m Z_m}{1.06 Z} \quad (17)$$

Substituting Equation 17 in Equation 14, we obtain $$Z I_m + \frac{0.085 Z}{1.06 Z}\left(M I_F - \frac{n}{2} I_m Z_m\right) + n I_m Z_m = 0 \quad (18)$$

whence $$I_m = -\frac{0.08 M}{Z + (0.96) n Z_m} I_F \quad (19)$$

The usual design will be to make $$Z_m \cong \frac{Z}{n} \quad (20)$$

since this matches the internal voltage-drops in the network-impedance $$\frac{Z}{n}$$

with the external voltage-drop in the useful-load impedance $Z_m$, and gives the maximum energy-consumption in the relay 22 for a given internal induced-voltage $I_F M$ upon the occurrence of a fault on the protected bus.

Substituting Equation 20 in Equations 6 and 19, we obtain $$I_m = -\frac{M}{2Z} I_f \quad (21)$$

for an internal fault, and $$I_m = -0.08 \frac{M}{2Z} I_F \quad (22)$$

for an external or through-current fault with the worst possible case of unbalanced heating of the current-transformers. This shows that, at the worst, a 30° temperature-differential would make the relay 8% as sensitive to through-faults as to bus-faults. If the ratio of maximum expectable through-fault current to the minimum expectable bus-fault current for which the relay is set to respond is not over $$\frac{1}{.08}$$

or about 12-to-1, this worst possible temperature-differential would not cause faulty tripping.

An important feature of my invention is that the open-circuiting of any one secondary circuit will not cause tripping under the maximum load-conditions, if the relay is set at a current-value greater than the maximum load-current, $I_L$, in any one feeder or bus-terminal. The worst possible condition would be when the secondary circuit on this feeder becomes open-circuited while the load-current $I_L$ is flowing in that feeder, there being no fault on the bus. Equation 2 will then become $$M I_L + Z I_m + (n-1) I_m Z_m = 0 \quad (23)$$

whence $$I_m = -\frac{M}{Z + (n-1) Z_m} I_L \quad (24)$$

Under the optimum-energy design-condition of Equation 20, and making the approximating assumption that $Z_m$ has the same $R/X$ ratio as $Z$, Equation 24 becomes $$I_m = -\frac{2n}{2n-1} \cdot \frac{M}{2Z} \cdot I_L \quad (25)$$

Comparison of Equation 25 with Equation 21 will show that the relay would have to be set at $$\frac{2n}{2n-1} I_L$$

or more, to avoid the possibility of tripping on the maximum load-current $I_L$ with one secondary open. For a 10-circuit bus, (neglecting the phase-angle between $Z_m$ and $Z$), this means a relay-setting corresponding to $$\frac{20}{19} I_L$$

or more.

This ability of my relay to avoid a faulty operation as a result of the open-circuiting of a secondary or relay-circuit, provides an opportunity for the open-circuit to be discovered, in the next periodic test, or by suitable supervisory alarm-means, and is believed to be preferable to "dumping" or disconnecting the heavy load as a result of an open-circuit condition in the relaying-circuit.

At the same time, even though one of the secondary circuits is open-circuited, my fault-responsive relay will respond to a bus-fault, provided that the current fed into the bus through the remaining terminals is in excess of the value corresponding to the minimum pick-up value of the relay 22. This is believed to be very desirable.

While the open-circuited condition exists in one of the secondary circuits, there is a danger of erroneously tripping the protected bus for a fault elsewhere, but this will occur only if the current through the circuit whose secondary is open is greater than $$\frac{2n-1}{2n}$$

times the trip-setting of the relay. On a bus with a great many radial feeders, there is a good chance of correct operation.

Fig. 1 also shows an illustrative form of embodiment of a polar-type, or polarized, supervisory relay 30, which has a plurality of coils 31 to 36, alternate coils being wound in alternate polarity, so that, if they are equally energized, as would normally be the case, they will oppose each other, in pairs. One of these supervisory-relay coils is connected in series-circuit relation with each of the secondary connecting-circuits associated with the respective terminal-couplers M, and a very small supervisory direct-current, of the order of milliamperes, which is well below the pick-up point of the fault-responsive relay 22, is circulated through the respective linear couplers M, by means of a small battery 37 which is connected across the metering bus 20—21 through a current-limiting resistor 38. In case the protected bus has an odd number of terminals, as in the illustrated example, the left-over supervisory-relay coil 36 is energized through a dummy-resistance 39, so as to carry the same current it would have carried if it had been connected in another secondary circuit of the relaying system.

By means of the supervisory-relay connection just described, if there should be any open-circuit condition or other faulty condition in any one of the secondary relaying circuits, the balanced condition between successive pairs of the supervisory-relay coils 31 to 36 will be disturbed, in one direction or the other, causing the movable spring-arm 40 of the supervisory relay 30 to move, in one direction or the other, and close one of the sets of contacts 41 or 42, so as to energize a bell or other alarm 43 across the supervisory battery 37.

Most of the energy for operating the supervisory relay 30 is obtained from its permanent magnet 44, or equivalent polarizing-means which is utilized to polarize the relay, and the amount of direct current which is carried by the coils 31 to 36 of this relay is so small, and the number of turns of the supervisory-relay coils 31 to 36 is so small, and on a magnetic circuit having so much air-gap therein, that the mutual coupling between these coils 31 to 36 is negligible in comparison with the rest of the impedance Z of the respective secondary circuits of my relaying system. The supervisory relay 30 also preferably has a damper-coil 45 which makes it insensitive to alternating currents.

The broad features of the particular form of supervisory relay 30, in a somewhat different application, are described and claimed in a companion application of Myron A. Bostwick and Bert V. Hoard, Serial No. 278,845, filed June 13, 1939, Patent Number 2,276,150, and assigned to the Westinghouse Electric & Manufacturing Company.

The particular form of linear coupler M—Z, which I prefer to utilize, is the toroidal current-transformer which is described and claimed in my previously mentioned copending application Serial No. 202,015. Two exemplary forms of embodiment of this coupler are shown in Figs. 2 and 3, respectively.

In Fig. 2, the secondary winding 50 is formed with an air-core toroid, and the winding 50 is wound in a plurality of pairs of layers, although only two layers 51 and 52 are illustrated, these layers progressing in opposite directions around the toroid, so that the second layer starts at the point where the first layer ends, and progresses backwardly around the toroid, overlying the first layer, so as to render the coil substantially astatic or unresponsive to magnetic fields or magnetic influences other than those circulating around within the toroid.

In Fig. 3, the toroidal core is made of an insulating material, as shown at 53, and is provided with a circularly extending peripheral slot 54 in which are placed the return-conductors 55 for the several coil-layers 56 and 57, each of these coil-layers traveling or progressing around the toroid in the same direction, in the process of winding the coil, the astatic properties being obtained by bringing back as many turns, in the reverse direction, by means of the return-conductors 55 which constitute as many turns in the backward direction as the forwardly progressing turns of the windings 56 and 57.

In either of the types of linear couplers shown in Figs. 2 and 3, it is feasible in quantity-production methods, to build coils which are sufficiently astatic.

I claim as my invention:

1. Summation current-responsive means for the detection of faults in a multi-terminal alternating-current apparatus to be protected, comprising, in combination: a relay with only one winding-circuit; a plurality of voltage-producing current-responsive means adapted to be associated, one with each terminal of the apparatus to be protected, for deriving, in each case, a voltage which is a substantially identical predetermined function of a terminal-current of the apparatus times an impedance which is substantially constant for all obtainable current-values and which is substantially the same for all terminals; and a plurality of connecting-circuits associated, one with each voltage-producing current-responsive means, for connecting the several voltage-producing current-responsive means, as parallel-connected sources of supply, to the terminals of said winding-circuit, said connecting-circuits including means for causing them to have substantially identical total impedances.

2. The invention as defined in claim 1, characterized by the impedance of each of the connecting-circuits being of the order of $n$ times the impedance of the voltage-energized current-responsive winding-circuit, where $n$ is the number of terminals of the apparatus to be protected.

3. The invention as defined in claim 1, characterized by the total impedance of each of the connecting-circuits being largely reactive.

4. The invention as defined in claim 1, characterized by each voltage-producing current-responsive means being substantially astatic and producing an internal voltage which is substantially linearly responsive to the first derivative of a terminal-current of the appparatus to be protected.

5. The invention as defined in claim 1, characterized by each voltage-producing current-responsive means being an air-gap current-transformer having a sufficient amount of air-gap to make the transformer substantially free of saturation-effects.

6. The invention as defined in claim 1, in combination with supervisory relay-means for responding to an open-circuit condition in any connecting-circuit or in the voltage-producing current-responsive means which is associated with any connecting circuit, said supervisory relay-means comprising a senitive direct-current relay having a plurality of pairs of balanced coils on a common magnetic circuit, the coils being connected in different individual connecting-circuits, and means for supplying, to the terminals of said common, voltage-energized current-responsive winding-circuit, a unidirectional supervisory current too small to actuate the fault-responsive device.

7. A relaying system comprising, in combination: an alternating-current relaying-device having a common winding-circuit; a plurality of sources of alternating-current relaying-energy; a plurality of connecting-circuits associated, one with each source, for connecting the several sources, in parallel-circuit relation, to the terminals of said common winding-circuit, said connecting-circuits having substantially identical total resistances; a sensitive direct-current supervisory relay having a plurality of pairs of balanced coils on a common magnetic circuit, the coils being connected in different individual connecting-circuits; and means for supplying, to the terminals of said common winding-circuit, a unidirectional supervisory current too small to actuate the alternating-current relaying-device.

EDWIN L. HARDER.